United States Patent
Zafar et al.

(10) Patent No.: US 10,664,819 B1
(45) Date of Patent: May 26, 2020

(54) SYSTEMS AND METHODS FOR ASSOCIATING A MOBILE DEVICE WITH A POINT OF SALE TERMINAL

(71) Applicant: JPMorgan Chase Bank, N.A., New York, NY (US)

(72) Inventors: Shadman Zafar, Plano, TX (US); Michael Naggar, Orinda, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 397 days.

(21) Appl. No.: 15/186,885

(22) Filed: Jun. 20, 2016

Related U.S. Application Data

(60) Provisional application No. 62/182,155, filed on Jun. 19, 2015.

(51) Int. Cl.
*G06Q 20/20* (2012.01)
*G06Q 20/10* (2012.01)
*H04W 76/14* (2018.01)

(52) U.S. Cl.
CPC ......... *G06Q 20/204* (2013.01); *G06Q 20/102* (2013.01); *H04W 76/14* (2018.02)

(58) Field of Classification Search
CPC ........ G06Q 20/00; G06Q 40/00; G06Q 20/32; G06Q 20/36; G06Q 30/00; G06Q 30/06; G06Q 30/02; G06F 13/00; G06F 17/00; G06F 3/16
USPC ..... 705/26.82, 17, 44, 41, 35, 38, 42, 14.36, 705/26.1, 14.65, 14.23, 14.1, 7.35; 235/375, 462.41
See application file for complete search history.

(56) References Cited

U.S. PATENT DOCUMENTS

| | | | | |
|---|---|---|---|---|
| 8,751,393 | B1* | 6/2014 | Murray | G06Q 40/02 705/42 |
| 8,768,775 | B1* | 7/2014 | Roper | G06Q 30/01 235/375 |
| 8,924,246 | B1* | 12/2014 | Chen | G06Q 20/023 705/26.82 |
| 9,100,493 | B1* | 8/2015 | Zhou | H04M 1/72522 |
| 9,152,477 | B1* | 10/2015 | Campbell | G06F 9/54 |
| 9,171,315 | B1* | 10/2015 | Jayaram | G06Q 30/0222 |
| 9,195,984 | B1* | 11/2015 | Spector | G06Q 20/3821 |
| 2004/0181450 | A1* | 9/2004 | Yamada | G06K 17/0022 705/14.36 |
| 2007/0282703 | A1* | 12/2007 | Sharpe | G06Q 30/0601 705/26.1 |

(Continued)

*Primary Examiner* — Olusegun Goyea
(74) *Attorney, Agent, or Firm* — Greenberg Traurig LLP

(57) ABSTRACT

Systems and methods for associating a mobile device with a point of sale terminal are disclosed. In one embodiment, a system for establishing a communication link between a mobile electronic device and a point of sale device may include a point of sale device comprising at least one computer processor, a memory, and a display that displays a machine readable code, the machine-readable code comprising a communication protocol for communicating with the point of sale device; a mobile electronic device comprising at least one computer processor, a memory, and a display; and an application executed by a mobile electronic device that receives a machine-readable code that is displayed by a point of sale device and establishes a communication link between the mobile electronic device and the point of sale device according to the communication protocol.

21 Claims, 3 Drawing Sheets

(56) References Cited

U.S. PATENT DOCUMENTS

| | | | |
|---|---|---|---|
| 2010/0012715 A1* | 1/2010 | Williams | G06Q 20/32 |
| | | | 235/375 |
| 2010/0306080 A1* | 12/2010 | Trandal | G06Q 10/10 |
| | | | 705/26.8 |
| 2011/0258065 A1* | 10/2011 | Fordyce, III | G06Q 10/10 |
| | | | 705/26.1 |
| 2012/0159149 A1* | 6/2012 | Martin | H04L 63/0823 |
| | | | 713/151 |
| 2012/0203697 A1* | 8/2012 | Morgan | H04W 12/06 |
| | | | 705/44 |
| 2013/0124360 A1* | 5/2013 | Mitrovic | G06Q 30/0611 |
| | | | 705/26.4 |
| 2013/0339115 A1* | 12/2013 | Soldate | G06Q 30/06 |
| | | | 705/14.23 |
| 2014/0207682 A1* | 7/2014 | Wolfond | G06Q 20/027 |
| | | | 705/44 |
| 2014/0304059 A1* | 10/2014 | Wang | G06Q 30/0225 |
| | | | 705/14.34 |
| 2014/0379526 A1* | 12/2014 | Parham | G06Q 30/0639 |
| | | | 705/26.41 |
| 2015/0073911 A1* | 3/2015 | Zhao | G06Q 30/0268 |
| | | | 705/14.65 |
| 2015/0088674 A1* | 3/2015 | Flurscheim | G06Q 20/3276 |
| | | | 705/17 |
| 2015/0127428 A1* | 5/2015 | Gharachorloo | G06Q 30/0283 |
| | | | 705/7.35 |
| 2015/0220934 A1* | 8/2015 | Chauhan | G06Q 30/012 |
| | | | 705/17 |
| 2015/0312038 A1* | 10/2015 | Palanisamy | H04L 9/3213 |
| | | | 713/155 |

* cited by examiner

SYSTEMS AND METHODS FOR ASSOCIATING A MOBILE DEVICE WITH A POINT OF SALE TERMINAL

RELATED APPLICATIONS

The present application claims priority to U.S. Provisional Patent Application Ser. No. 62/182,155, filed Jun. 19, 2015, the disclosure of which is hereby incorporated, by reference, in its entirety.

In addition, the present application is related to U.S. Provisional Patent Application Ser. No. 62/182,171, filed Jun. 19, 2015, U.S. patent application Ser. No. 14/699,511, filed Apr. 29, 2015; U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014. The disclosure of each of these documents is hereby incorporated, by reference, in its entirety.

BACKGROUND OF THE INVENTION

1. Field of the Invention

The present invention generally relates to payment processing, and, more specifically, to systems and methods for associating a mobile device with a point of sale terminal.

2. Description of the Related Art

Mobile electronic devices are ubiquitous. Today, a mobile electronic device serves as a telephone, camera, calculator, web browser, information source, etc. These device provide the user with the ability to retrieve information at almost any time and in almost any location.

SUMMARY OF THE INVENTION

Systems and methods for associating a mobile device with a point of sale terminal are disclosed. In one embodiment, a system for establishing a communication link between a mobile electronic device and a point of sale device may include a point of sale device comprising at least one computer processor, a memory, and a display that displays a machine readable code, the machine-readable code comprising a communication protocol for communicating with the point of sale device; a mobile electronic device comprising at least one computer processor, a memory, and a display; and an application executed by a mobile electronic device that receives a machine-readable code that is displayed by a point of sale device and establishes a communication link between the mobile electronic device and the point of sale device according to the communication protocol.

In one embodiment, the communication link between the mobile electronic device and the point of sale device enables one-way communication from the point of sale device to the mobile electronic device. In another embodiment, the communication link between the mobile electronic device and the point of sale device is bi-directional. The communication protocol may be a direct radio frequency communication link, a cloud-based communication link, proximity/location based, machine-readable code-based (e.g., QR code, bar code, etc.), etc.

In one embodiment, the method may further include the application receiving, from the point of sale device and over the communication link, item data for an item that has been presented at the point of sale device; and the application displaying at least a portion of the item data on the display of the mobile electronic device.

In one embodiment, the method may further include the application retrieving, from a database, additional item data for the item; and the application displaying at least a portion of the additional item data on the display of the mobile electronic device.

A method of establishing a communication link between a mobile electronic device and a point of sale device is disclosed. According to one embodiment, the method may include (1) a point of sale device comprising at least one computer processor, a memory, and a display displaying a machine readable code, the machine-readable code comprising a communication protocol for communicating with the point of sale device; (2) the point of sale device receiving a communication from a mobile electronic device in accordance with the communication protocol; and (3) the point of sale device establishing a communication link with the mobile electronic device in accordance with the communication protocol.

In one embodiment, the communication link between the mobile electronic device and the point of sale device enables one-way communication from the point of sale device to the mobile electronic device. In another embodiment, the communication link between the mobile electronic device and the point of sale device is bi-directional. The communication protocol may be a direct radio frequency communication link, a cloud-based communication link, etc.

In one embodiment, the method may further include the point of sale device scanning a code for an item; the point of sale device retrieving, from a database or other memory/storage medium, item data for the item associated with the code; and the point of sale device communicating the item data to the mobile electronic device over the communication link.

In one embodiment, the method may further include the point of sale device receiving, from the mobile electronic device and over the communication link, payment for a transaction conducted at the point of sale device.

Systems for establishing a communication link between a mobile electronic device and a point of sale device are disclosed. According to one embodiment, the system may include a point of sale device comprising at least one computer processor, a memory, and a display that displays a machine readable code, the machine-readable code comprising a communication protocol for communicating with the point of sale device; a mobile electronic device comprising at least one computer processor, a memory, and a display; and an application executed by a mobile electronic device that receives a machine-readable code that is displayed by a point of sale device and establishes a communication link between the mobile electronic device and the point of sale device according to the communication protocol.

In one embodiment, the system may further include a server that generates the machine-readable code that is displayed by the point of sale device display.

In one embodiment, the system may further include at least one database in communication with the point of sale device that retrieves item data for an item that is scanned by the point of sale device, and the point of sale device communicates the item data to the mobile electronic device over the communication link.

In one embodiment, the communication link between the mobile electronic device and the point of sale device enables one-way communication from the point of sale device to the mobile electronic device. In another embodiment, the communication link between the mobile electronic device and the point of sale device is bi-directional. The communication protocol may be a direct radio frequency communication link, a cloud-based communication link, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
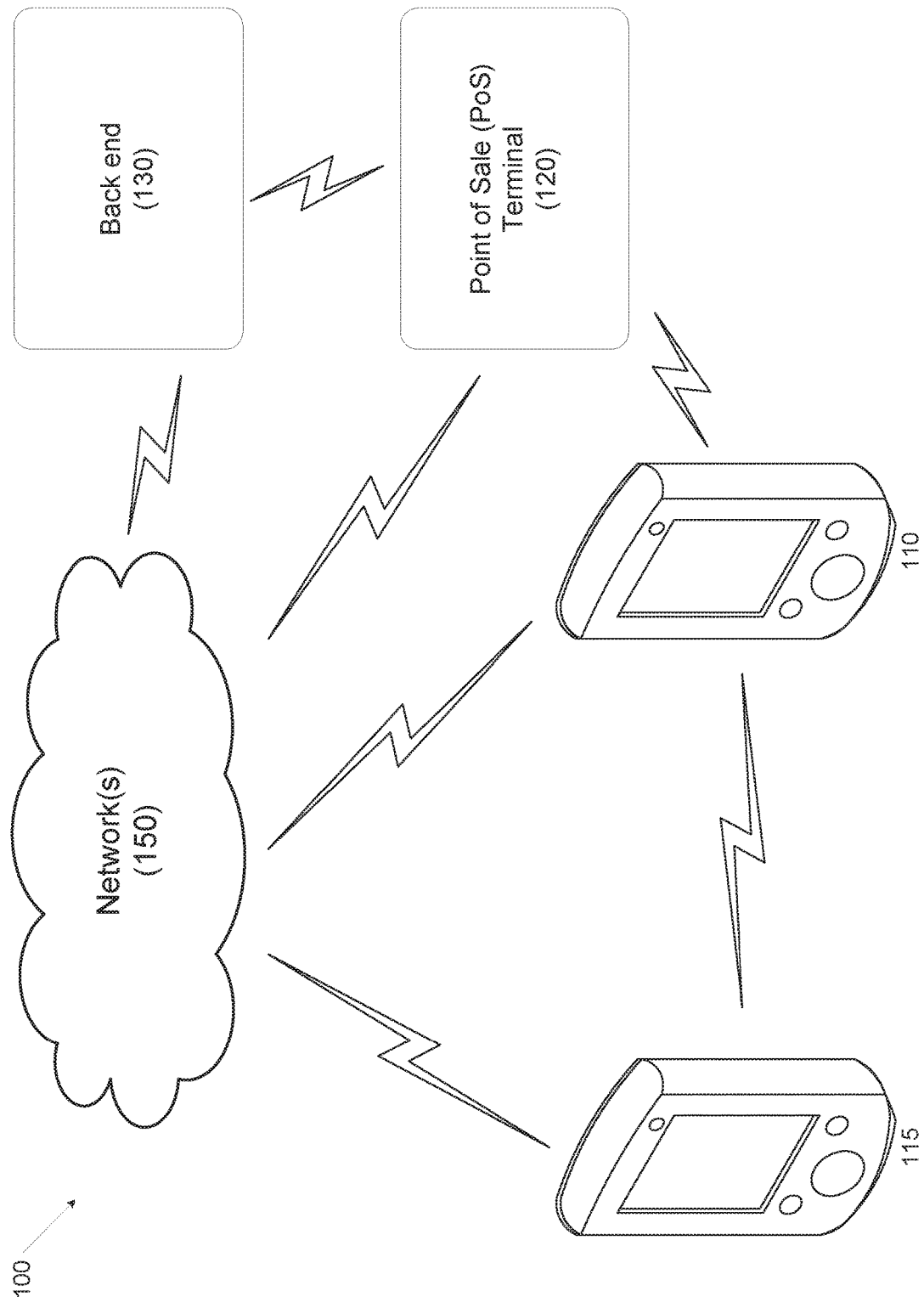
FIG. 1 depicts a system for associating a mobile device with a point of sale terminal according to one embodiment.
Figure 2:
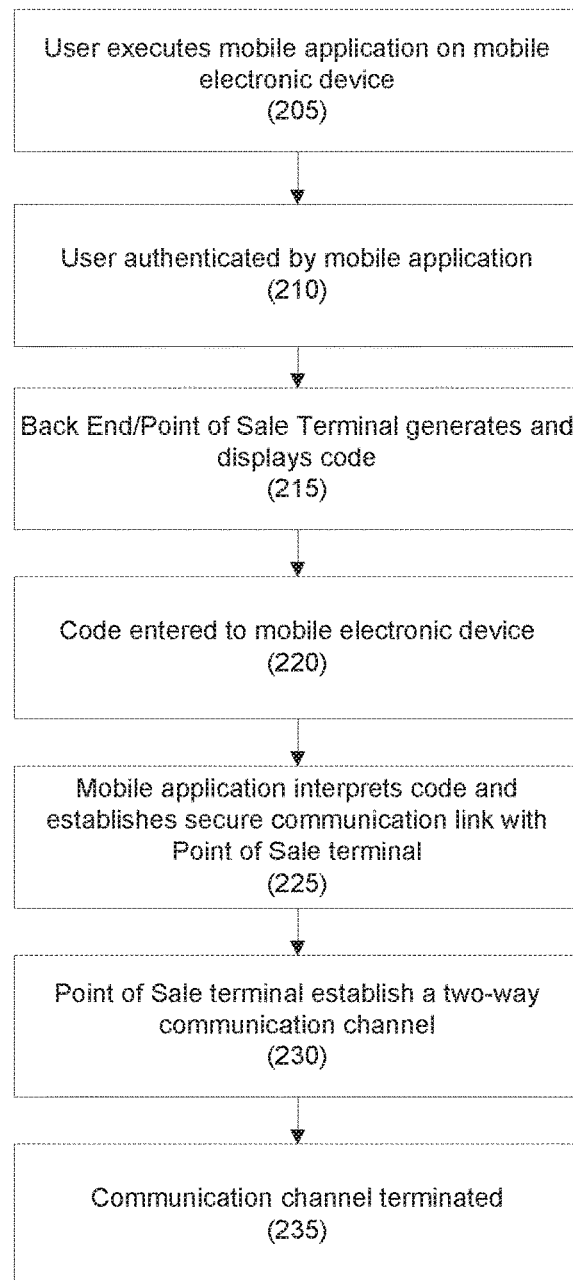
FIG. 2 depicts a method for associating a mobile device with a point of sale terminal according to one embodiment.
Figure 3:
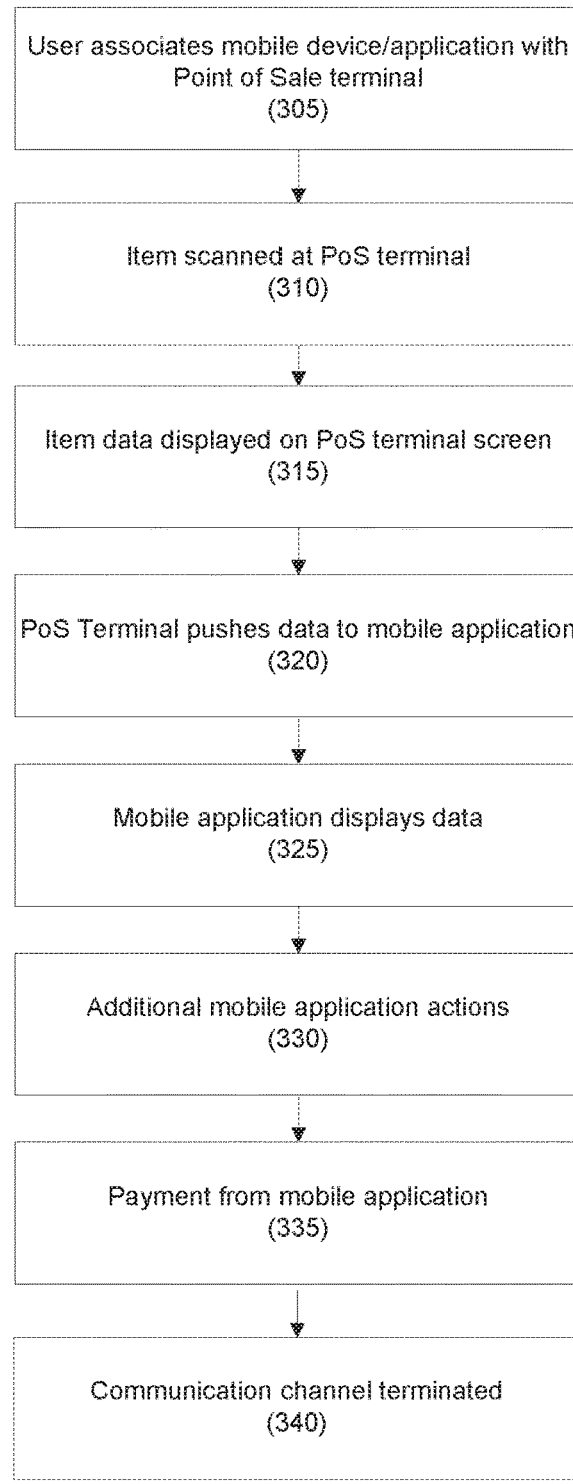
FIG. 3 depicts a method for providing point of sale information to a mobile device according to one embodiment.

Several embodiments of the present invention and their advantages may be understood by referring to FIGS. 1-3.

Embodiments disclosed herein associate a mobile device with a point of sale terminal. In one embodiment, a customer may associate, or "pair," a mobile electronic device that is executing a mobile application, such as a banking application, a third party wallet, etc. to a point of transaction (e.g., a Point-of-Sale (PoS) terminal) using a code, such as a machine-readable code (e.g., a QR code), etc. The PoS and/or a backend server may generate the code. In one embodiment, the code may be encoded with, for example, an identifier for the PoS and/or an identifier that is associated with a transaction, a transaction price, etc. In another embodiment, the code may include a key, an identification of a communication URL, a communication channel for communications, a URL for sharing data, etc. In still another embodiment, the code may include customer information. Any of these elements, combinations of elements, or other information may be included in the code as is necessary and/or desired.

In another embodiment, the code may be static and assigned to the specific PoS terminal.

Once generated, the code may be presented for the mobile electronic device on, for example, the PoS screen. The user may enter the code into the mobile electronic device by, for example, capturing an image of the code using the mobile electronic device's camera.

In one embodiment, the mobile device may interpret the code and identify the PoS terminal, the transaction, and any other information provided by the code and/or a link provided in the code.

The pairing may involve a server, and a network connection (e.g., the Internet, a VPN, etc.); it may also be a direct connection between the mobile device and the PoS terminal using, for example, NFC, Bluetooth, WiFi, etc.

In one embodiment, the communication may be terminated when the PoS terminal is ready for another transaction, when a predetermined period of time has passed, when the customer terminates the connection, etc.

In another embodiment, the mobile device may present information that may be displayed on the PoS terminal's screen. For example, as items are scanned by a cashier, an item name/identifier and a price may be displayed on the PoS terminal's display. After a secure communication channel is established between the mobile device and the PoS terminal, information for each scanned item may be pushed to the mobile device and displayed on the mobile device's screen.

In one embodiment, the information may be displayed substantially in real time. In another embodiment, the information may be displayed with a delay. In one embodiment, the user of the mobile device may customize the manner in which the information is displayed on the mobile device.

In one embodiment, the information displayed on the mobile terminal's screen may be the same information that is displayed on the PoS terminal's screen. In another embodiment, additional information may be provided for the mobile device. For example, the mobile device may receive a full description of an item without abbreviations. It may include size, weight, any savings, and other information that may not be displayed on the PoS terminal's display.

In one embodiment, the information may also include product reviews, suggested items to consider (e.g., related items (such as ink for a printer, other ingredients that may be used in a recipe including the item), recommended items (such as those purchased by others purchasing the same item), etc.), return policy information, warranty information (including, for example, extended warranty options), etc. The type and amount of information that may be provided may be determined as is necessary and/or desired, and may be determined based on customer and/or merchant preferences.

In one embodiment, as each item is scanned, a mobile application may compare the item's price to prices from other vendors, and the user may be notified if the item price is outside of a defined threshold for the item. The comparison may be geographically limited, may be limited by item type, preferred stores (e.g., a user may identify stored that he or she would like pricing for, etc.). In one embodiment, the user may identify an item that has a price above the threshold to the PoS, the merchant, etc. for price-matching or removal.

In one embodiment, the data may be pushed to a second electronic device that may or may not be in the vicinity of the mobile electronic device. For example, as items are scanned, item information may be provided to the mobile electronic device that is associated with the PoS terminal, and also to a second electronic device. The second electronic device may have a pre-established association with the first electronic device, or it may be added on an ad-hoc basis.

In one embodiment, as items are identified to the mobile device, the items may be checked off of an electronic shopping list that the user may have established. The user may be notified of any items that were on the electronic shopping list that were not identified as being purchased.

In one embodiment, as items are displayed, the user may identify any item for a price check, as a duplicate scan, etc. by selecting the item on the mobile device screen. The mobile device may then communicate the inquiry or dispute to the PoS terminal for resolution.

In one embodiment, receipts may be stored on the mobile device, in the cloud, etc. In one embodiment, the customer may identify and submit item(s) from the receipt for reimbursement (e.g., expense accounts), for product/warranty registration, for exporting to financial software (e.g., budgeting, tax preparing, etc.), for item returns, etc.

In one embodiment, information from the receipts may be used for registering an item, for returns, etc.

In one embodiment, the merchant may receive identifying information from the mobile device, such as a phone number, email address, physical address, etc. and may use that to upsell products/services to the customer. For example, a customer may purchase an electronic device, and as the manufacturer's warranty is set to expire, the merchant may use the purchase date, the known warranty expiration, and the identifying information to offer an extended warranty to the customer.

In another embodiment, the code may be generated by the mobile application and may be displayed for the PoS terminal. The PoS terminal may receive the code, and establish paring with the mobile application in any of the manners discussed herein.

Referring to FIG. 1, a system for associating a mobile device with a point of sale terminal is disclosed according to one embodiment. System 100 may include mobile devices 110 and 115, a point of transaction (e.g., a point of sale (PoS) terminal) 120, back end 130, and network(s) 150.

In one embodiment, mobile devices 110 and 115 may be any suitable mobile electronic device, including smartphones, tablet computers, notebook computers, smart glasses, Internet appliances, etc. Mobile devices 110 and 115 may execute a mobile computer application, such as a mobile wallet application, a mobile payment application, a merchant application, an application provided by a financial instrument issuer, a third party application, etc.

In one embodiment, one or more of mobile devices 110 and 115, and PoS terminal 120 may communicate via network(s) 150. In addition, one or more of mobile devices 110 and 115, and PoS terminal 120 may communicate directly via any suitable communication channel, such as WiFi, Bluetooth, NFC, IR, etc.

In one embodiment, PoS terminal 120 may comprise a typical PoS terminal, and may include a UPC (Universal Product Code) (or similar code) scanner, an operator interface, a display, and a payment interface.

In one embodiment, back end 130 may comprise one or more computer processors/servers, databases, external interfaces, etc. In one embodiment, back end 130 may generate a machine-readable code, such as a QR code, for PoS terminal 120. The machine-readable code may be encoded with, for example, one or more of an identifier for PoS terminal 120, a transaction identifier, a key, an identification of a communication URL, a communication channel for communications, a URL for sharing data, etc. In another embodiment, PoS terminal 120 may generate the code.

PoS terminal 120 may then display the code for the user on a display.

Alternatively, mobile devices 110 and 115 may display a code that may be presented to and received by PoS terminal 120. The code may be generated by the mobile application executed by mobile device 110 or 115, back end 130, a third party (not shown), etc.

In one embodiment, back end 130 may communicate with external systems, such as pricing databases, other vendors (e.g., online vendors, brick and mortar vendors, extended warranty vendors, etc.), circular publishers (e.g., supermarket circulars), service providers (e.g., extended warranty companies), etc.

In one embodiment, receipts and other data may be stored mobile electronic devices 110 and/or 115, in cloud storage (not shown), etc.

Referring to FIG. 2, a method for associating a mobile device with a point of sale terminal is disclosed according to one embodiment. In step 205, the user of a mobile electronic device may execute a mobile application on a mobile electronic device. In one embodiment, the mobile application may be a mobile browser accessing a website. In another embodiment, the mobile application may be a financial institution's mobile application. In another embodiment, the mobile application may be a credit card issuer's mobile application. In another embodiment, the mobile application may be a third party wallet. In another embodiment, the mobile application may be a mobile payment application. In another embodiment, the mobile application may be a merchant's mobile application. Other types of mobile applications may be used as necessary and/or desired.

In one embodiment, the user may be in proximity of a PoS terminal. For example, the user may be in a check-out line or otherwise interacting with a cashier. In another embodiment, the user may within a merchant's store.

In step 210, the user may be authenticated by the mobile device. For example, the user may be authenticated by entering a username and password, providing biometric information, providing a PIN or passcode, etc.

In step 215, the back end and/or PoS terminal may generate a code to be entered to the mobile electronic device. As discussed above, the code may be a machine-readable code, such as a QR code. The code may be encoded with, or may include, for example, one or more of an identifier for PoS terminal 120, a transaction identifier, a key, an identification of a communication URL, a communication channel for communications, a URL for sharing data, etc. In another embodiment, PoS terminal 120 may generate the code.

In step 220, the code may be received by the mobile application and/or the mobile device. In one embodiment, the customer may enter the code by scanning or imaging it using the mobile device's camera. In another embodiment, the mobile device may receive the code in a RF transmission from the PoS terminal (e.g., Bluetooth, Near Field Communication, etc.). In another embodiment, the mobile device may receive a beacon from the PoS terminal or merchant. In another embodiment, the mobile application/mobile device may initiate communication with the merchant back end based on, for example, the geographical location of the mobile device.

In step 225, the mobile application may interpret the code and may establish a communication link with the PoS terminal. In one embodiment, the communication link may be secure.

In one embodiment, the link may be through the cloud. In another embodiment, the link may be a direct link between the mobile application and the PoS device. In still another embodiment, the link may be provided at a URL (e.g., a secure URL). In still another embodiment, the mobile application may tune a radio of the mobile device to a certain frequency that may be provided in the code. In yet another embodiment, the mobile application may open a secure communication channel (e.g., a VPN) with the PoS device. Other types and methods of establishing a communication link between the mobile application and the PoS device may be used as necessary and/or desired.

In step 230, the PoS Terminal may establish a two-way (e.g., bidirectional) communication channel with the mobile device.

After the two-way communication is established, the PoS terminal and the mobile device may communicate with each other directly. As will be described below, the PoS terminal may "push" or otherwise send data, such as item data for items being scanned, receipts, etc. to the mobile device. Similarly, the mobile application may send data, such as payment data, etc. to the PoS terminal. Other data may be exchanged as is necessary and/or desired.

In another embodiment, the mobile application may pull data from the PoS terminal and/or URL.

In step 235, the communication channel may be terminated. In one embodiment, the communication channel may be terminated when the PoS terminal is ready for a new transaction. In another embodiment, the communication channel may be terminated when payment is made. In another embodiment, the communication channel may be terminated if the user closes the mobile application, turns off the radio, or otherwise determines that the communication should be terminated.

In one embodiment, the mobile application may terminate the communication if fraud is suspected.

In another embodiment, the mobile application and/or mobile device may provide the code to the PoS terminal. For example, the mobile application and/or mobile device may generate the code, display the code, and present the code to the PoS terminal. In another embodiment, the code may be generated by a third party, by the merchant back end, etc., and provided to the mobile application and/or mobile device. The mobile application and/or mobile device may then provide the code to the PoS terminal, and the connection may be established by the PoS terminal and/or the back end.

Referring to FIG. 3, a method of providing data to a mobile device according to one embodiment is provided.

In step 305, the mobile device and/or mobile application may be associated with a point of transaction, such as a PoS terminal. This association may be established as described above.

In step 310, an item that is being presented for purchase may be scanned, imaged, or otherwise identified to the PoS terminal. For example, the cashier may scan the UPC for the item. Alternatively, the cashier may manually enter UPC data for the item, pricing data for the item, etc.

In step 315, item data for the item may be displayed on a display associated with the PoS terminal. For example, the PoS terminal may look up the item information in a database (local and/or remote). In one embodiment, only a certain amount of information for the item may be displayed on the PoS terminal display.

In step 320, the PoS terminal may push item data to the mobile application using the secure communication channel. In one embodiment, the data that is pushed may be the same data that is displayed.

In another embodiment, the PoS terminal may push the data to a share link that was provided to the mobile application.

In still another embodiment, the mobile application may pull/retrieve the data from the PoS terminal, the link, and/or the cloud.

In one embodiment, additional data may be retrieved from remote databases (e.g., manufacturer's database) and pushed to the mobile device.

In step 325, the mobile application may display the item data. In one embodiment, the same data that is displayed in the PoS terminal display may be displayed. In another embodiment, additional data may be displayed.

In step 330, additional mobile application actions may be taken. For example, in one embodiment, the user may identify an item to dispute a price, a quantity, etc. The mobile application may communicate the dispute to the PoS terminal for resolution.

In another embodiment, as item data is received, the mobile application may compare the item price to prices from other merchants. The user may set preferences regarding when to be notified (e.g., if the price exceeds a threshold), the merchants to compare, the distance from the current location, etc. For example, if the user prefers an certain grocery store for convenience, atmosphere, etc. the user may not want price comparisons with other stores that do not offer that environment, that are beyond a certain distance away from the user's current location, etc. The user may, however, want comparisons when making more expensive purchases (e.g., electronic equipment).

In one embodiment, the user may provide the comparison price to the PoS terminal for potential price matching.

In another embodiment, as item data is received, items may be removed from a shopping list that the user may have prepared before shopping. At the conclusion of the scanning, the user may be informed of any items on the shopping list that were not purchased.

In one embodiment, the mobile application may be used to scan items instead of, or in addition to, the PoS scanner. For example, a customer may scan items that are in the customer's shopping cart, may assist the cashier, or may stage a transaction while waiting for the cashier.

In one embodiment, the user may have some or all of the data, such as the items scanned, price, etc., pushed to a second electronic device. For example, the second electronic device may also be associated with the PoS terminal; it may also be associated with the user's mobile electronic device. Some or all of the data may be sent from the PoS terminal and/or the mobile electronic device to the second electronic device.

In one embodiment, the user may store receipts on the mobile electronic device, in the cloud, etc. The user may submit the receipts for expense tracking, tax purposes, warranty registration, etc.

In step 335, after scanning is complete, the user may pay for the transaction. For example, the user may have the mobile application transmit payment information to the PoS terminal using the secure channel.

In step 340, the communication channel may be terminated. This may be similar to step 235, discussed above.

The disclosure of U.S. patent application Ser. Nos. 15/088,437 and 15/069,418 are hereby incorporated, by reference, in their entireties.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of establishing a communication link between a mobile electronic device and a point of sale device, comprising:
    an application executed by a mobile electronic device receiving a machine-readable code that is displayed by a point of sale device, the mobile electronic device comprising at least one computer processor, a memory, and a display;
    the application extracting, from the machine-readable code, a communication protocol for communicating with the point of sale device;
    the application causing the mobile electronic device to establish a communication link with the point of sale device in accordance with the communication protocol;
    as an item is presented to the point of sale device, the application receiving, from the point of sale device and over the communication link, item data for the item, wherein the item data comprises item price data for the item, product reviews for the item, and suggested other items to purchase based on the item;
    as the item data is received by the application, the application displaying at least a portion of the item data on the display of the mobile electronic device;
    the application retrieving, from a database, third party item price data for the item from a third party vendor;
    the application displaying the third party item price data on the display of the mobile electronic device.

2. The method of claim 1, wherein the communication link between the mobile electronic device and the point of sale device enables one-way communication from the point of sale device to the mobile electronic device.

3. The method of claim 1, wherein the communication link between the mobile electronic device and the point of sale device is bi-directional.

4. The method of claim 1, wherein the communication protocol is a direct radio frequency communication link.

5. The method of claim 1, wherein the communication protocol is a cloud-based communication link.

6. The method of claim 1, further comprising:
    the application storing a shopping list on the mobile electronic device comprising one or more items;
    the application removing items from the shopping list as each item's item data is received.

7. The method of claim 1, further comprising:
    the application sending the third party item price data from the third party vendor to the point of sale device for potential price matching.

8. A method of establishing a communication link between a mobile electronic device and a point of sale device, comprising:
    a point of sale device comprising at least one computer processor, a memory, and a display displaying a machine readable code, the machine-readable code comprising a communication protocol for communicating with the point of sale device;
    the point of sale device receiving a communication from a mobile electronic device in accordance with the communication protocol;
    the point of sale device establishing a communication link with the mobile electronic device in accordance with the communication protocol;
    as an item is presented to the point of sale device, the point of sale device scanning a code for an item;
    the point of sale device retrieving, from a database, item data for the item associated with the code, wherein the item data comprises item price data for the item, product reviews for the item, and suggested other items to purchase based on the item; and the point of sale device communicating the item data to the mobile electronic device over the communication link, wherein an application executed by the mobile electronic device displays at least a portion of the item data on the display of the mobile electronic device as the item data is received by the application.

9. The method of claim 8 wherein the communication link between the mobile electronic device and the point of sale device enables one-way communication from the point of sale device to the mobile electronic device.

10. The method of claim 8, wherein the communication link between the mobile electronic device and the point of sale device is bi-directional.

11. The method of claim 8, wherein the communication protocol is a direct radio frequency communication link.

12. The method of claim 8, wherein the communication protocol is a cloud-based communication link.

13. The method of claim 8, further comprising:
wherein the item data further comprises warranty information for the item.

14. The method of claim 8, further comprising:
the point of sale device receiving, from the mobile electronic device and over the communication link, payment for a transaction conducted at the point of sale device.

15. A system for establishing a communication link between a mobile electronic device and a point of sale device, comprising:
a point of sale device comprising at least one computer processor, a memory, and a display that displays a machine readable code, the machine-readable code comprising a communication protocol for communicating with the point of sale device;
at least one database in communication with the mobile electronic device;
a mobile electronic device comprising at least one computer processor, a memory, and a display; and
an application executed by the mobile electronic device that receives a machine-readable code that is displayed by a point of sale device and establishes a communication link between the mobile electronic device and the point of sale device according to the communication protocol;
wherein the application executed by the mobile electronic device is configured to:
as an item is presented to the point of sale device, receive, from the point of sale device and over the communication link, item data for the item, wherein the item data comprises item price data for the item, product reviews for the item, and suggested other items to purchase based on the item;
as the item data is received by the application, display at least a portion of the item data on the display of the mobile electronic device;
retrieve, from the at least one database, third party item price data for the item from a third party vendor; and
display at least a portion of the additional item data on the display of the mobile electronic device.

16. The system of claim 15, further comprising:
a server that generates the machine-readable code that is displayed by the point of sale device display.

17. The system of claim 15, further comprising:
wherein the application executed by the mobile electronic device is further configured to send the item price data from the third party vendor to the point of sale device for potential price matching.

18. The system of claim 15, wherein the communication link between the mobile electronic device and the point of sale device enables one-way communication from the point of sale device to the mobile electronic device.

19. The system of claim 15, wherein the communication link between the mobile electronic device and the point of sale device is bi-directional.

20. The system of claim 15, wherein the communication protocol is a direct radio frequency communication link.

21. The system of claim 15, wherein the communication protocol is a cloud-based communication link.

* * * * *